US009387734B1

(12) United States Patent
Alhazmi (10) Patent No.: US 9,387,734 B1
(45) Date of Patent: Jul. 12, 2016

(54) INTELLIGENT EMBEDDED SYSTEM DEVICE FOR MONITORING CAR WHEEL PERFORMANCE

(71) Applicant: Hussain Ali Alhazmi, Rahway, NJ (US)

(72) Inventor: Hussain Ali Alhazmi, Rahway, NJ (US)

(*) Notice: Subject to any disclaimer, the term of this patent is extended or adjusted under 35 U.S.C. 154(b) by 0 days.

(21) Appl. No.: 14/670,054

(22) Filed: Mar. 26, 2015

(51) Int. Cl.
*B60C 23/02* (2006.01)
*B60C 23/04* (2006.01)

(52) U.S. Cl.
CPC .................................. *B60C 23/0486* (2013.01)

(58) Field of Classification Search
CPC .................................................. B60C 23/0486
USPC .................................................. 340/442, 447
See application file for complete search history.

(56) References Cited

U.S. PATENT DOCUMENTS

| 5,488,471 | A | 1/1996 | McClenahan et al. |
| 6,181,993 | B1 | 1/2001 | Dale, Jr. et al. |
| 6,237,234 | B1 | 5/2001 | Jackson et al. |
| 6,313,742 | B1* | 11/2001 | Larson ........................ 340/442 |
| 8,332,092 | B2 | 12/2012 | Laermer et al. |
| 8,615,344 | B2* | 12/2013 | Boss et al. ................... 701/32.3 |
| 2009/0139327 | A1 | 6/2009 | Dagh et al. |
| 2015/0165835 | A1* | 6/2015 | Peine ................. B60C 23/0416 340/447 |

FOREIGN PATENT DOCUMENTS

| EP | 1 845 337 | 6/2011 |
| JP | 2005-14813 | 1/2005 |
| JP | 2006-56490 | 3/2006 |

* cited by examiner

*Primary Examiner* — Brent Swarthout
(74) *Attorney, Agent, or Firm* — Oblon, McClelland, Maier & Neustadt, L.L.P (57) ABSTRACT

A monitoring system includes sensors, clocks, global positioning systems (GPS) receiver, display screens and a controller circuitry. The controller circuitry is configured to analyze the collected signals, the time information, and the route information to identify at least one trigger factor based on a tire characteristic; determine whether the identified at least one triggering factor exceeds an triggering threshold based on the collected signals and information; derive when the identified triggering factor exceeds the triggering threshold, an triggering priority indicating an order in which the triggering factors are processed based on the collected signals and route information; trigger a tire monitoring procedure based on the collected information, the triggering threshold and the triggering priority; and display at the display screen, results of the tire monitoring procedure to provide a visual indication of the tire characteristic that caused the triggers factor to exceed the triggering threshold.

14 Claims, 11 Drawing Sheets

INTELLIGENT EMBEDDED SYSTEM DEVICE FOR MONITORING CAR WHEEL PERFORMANCE

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

TECHNICAL FIELD

The exemplary embodiments described herein are related to the field of car wheel system.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Tire monitoring systems have been the subject of ongoing efforts. Fluctuations in forces normal to the road surface at the tire-road interface for each of the wheels will affect the traction characteristics of the tire. As recognized by the present inventor, an automatic intelligence wheel cover monitoring system can be used to detect parameters of tires and provide the information to the auto drivers.

SUMMARY

For one embodiment, there is provided a tire monitoring implemented by a tire monitoring system, the method including: collecting, at a sensor mounted to a wheel cover of an automobile wheel, signals emitted from at least one sensor mounted to another wheel cover; collecting at a controller circuitry mounted to a wheel cover of the automobile wheel, the route information from a global positioning system (GPS) receiver disposed on the automobile; collecting at the controller circuitry time information from a clock; analyzing at the controller circuitry the collected signals, the time information, and the route information to identify at least one trigger factor based on the tire characteristics; determining at the controller circuitry whether the at least one triggering factor exceeds an triggering threshold based on the collected signals and information; deriving at the controller circuitry when the identified triggering factor exceeds the triggering threshold, an triggering priority indicating an order in which the triggering factors are processed based on the collected signals, time and route information; triggering from the controller circuitry to the sensor, a tire monitoring procedure based on the collected information, the triggering threshold and the triggering priority; and displaying at a display screen results of the tire monitoring procedure to provide a visual indication of the tire characteristic that caused the triggers factor to exceed the triggering threshold.

For another embodiment, there is provided a monitoring system for automatically triggering a tire monitoring procedure, comprising: one or more sensors mounted to a wheel cover of an automobile wheel configured to collect information from one or more tires or surrounding environment information; one or more clocks configured to provide time information; one or more global positioning system (GPS) receivers disposed on the automobile, wherein the GPS receivers are configured to provide route information; one or more display screens configured to show tire monitoring information and a controller circuitry configured to analyze the collected signals, the time information, and the route information to identify at least one trigger factor based on a tire characteristic; determine whether the identified at least one triggering factor exceeds an triggering threshold based on the collected signals and information; derive when the identified triggering factor exceeds the triggering threshold, an triggering priority indicating an order in which the triggering factors are processed based on the collected signals and route information; trigger a tire monitoring procedure based on the collected information, the triggering threshold and the triggering priority; and display at the display screen, results of the tire monitoring procedure to provide a visual indication of the tire characteristic that caused the triggers factor to exceed the triggering threshold.

For another embodiment, there is provided a tire monitoring controller for automatically triggering tire monitoring procedure, the controller comprising: processing circuitry configured to analyze the collected signals, the time information, and the route information to identify at least one trigger factor based on a tire characteristic; determine whether the identified at least one triggering factor exceeds an triggering threshold based on the collected signals and information; derive when the identified triggering factor exceeds the triggering threshold, an triggering priority indicating an order in which the triggering factors are processed based on the collected signals and route information; trigger a tire monitoring procedure based on the collected information, the triggering threshold and the triggering priority; and display at the display screen, results of the tire monitoring procedure to provide a visual indication of the tire characteristic that caused the triggers factor to exceed the triggering threshold.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

The disclosure is related to an intelligent tire monitoring system and method which can be used to monitor a vehicle tire. The system can provide driver information about tire pressure, tire vibration and wheel alignment to determine whether the tires need maintenance.

Figure 1:
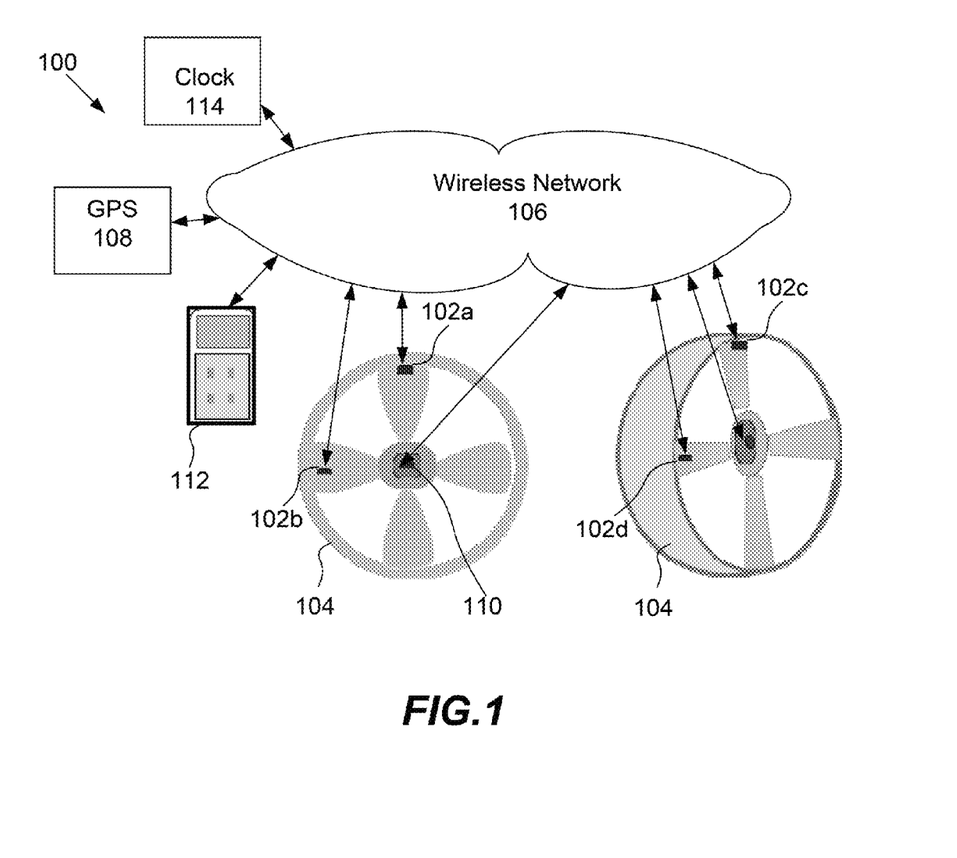
FIG. 1 is a schematic diagram of one embodiment of a tire monitoring system according to one example.

Referring to FIG. 1, one embodiment of an automatic tire monitoring system (ATMS) 100 implemented in a vehicle is depicted. ATMS 100 includes a plurality of sensor devices 102 mounted on or about a wheel cover 104 of tires, a global positioning system (GPS) receiver 108, a display screen 112, a wireless network 106, a clock 114 and a central controller 110. The central controller 110 communicates with the sensors 102, the clock 114, the GPS 108 and the display screen 112 the wireless network 106. The ATMS 100 optionally comprises additional tire- or vehicle-mounted components (not shown) for storing data, transmitting communications, and carrying out other functions. Further, while FIG. 1 depicts four sensors 102, ATMS 100 can comprise more or fewer sensors in other embodiments, arranged in configurations other than the example depicted and described in more detail below.

Figure 2:
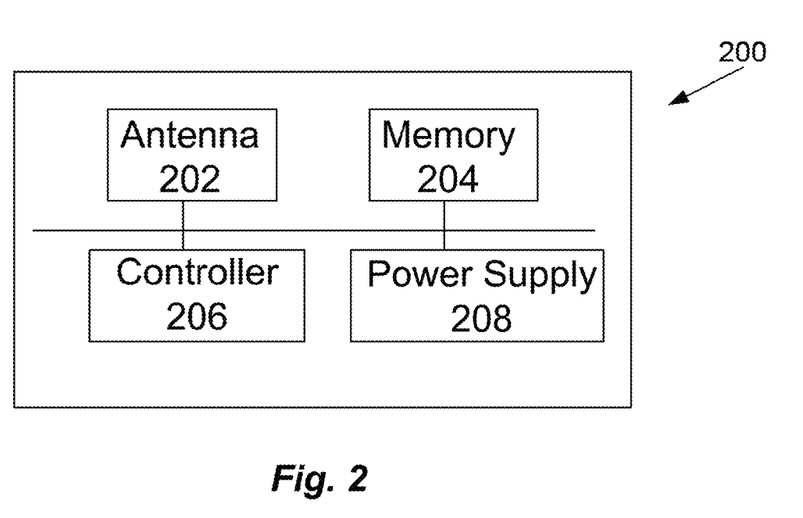
FIG. 2 is a schematic diagram of one embodiment of a sensor according to one example.

The plurality of sensors 102 include one or more pressure sensors, one or more acceleration sensors, one or more temperature sensors and one or more light sensors. Each sensor 102 is mounted on the wheel cover 110 of the wheel. Each sensor is located at a point suited for taking measurements associated with the respective sensor type or application, such as a periphery of the wheel cover for accelerometers. Moreover, each sensor 102 further comprises a transmission interface 200 that enables transmission and reception of wireless signals.

To help monitor wheel alignment and balance, to accelerometer placed on diametrically opposed positions on the circumstance of the wheel covers. The accelerometers are ganged together such that a lateral movement of one sensor is observed by the other sensor, & vice versa. Thus, when the wheel is spinning, both sensors experience the same orbital motion, although a wheel is unaligned may exhibit wobble and unbalanced tire may exhibit road bounce, such that the apparent relative trajectory of each sensor varies on the tire rotates. In an unaligned situation, one sensor will be moving right, while the other is moving left relative to the moving direction of the vehicle. In an unbalanced situation, the up and down movement of the sensors will be greater, on average, than a predetermined amount, such as 0.5 cm to 2 cm per rotation.

An exemplary transmission interface 200 is shown in FIG. 2. The transmission interface is configured to send or receive information between other sensor device or the controller. The transmission interface include a controller 206, such as an application specific integrated circuit, processor, etc., a memory 204, one or more antennas 202 and a power supply 208. The antenna 202 may be a short-range radio frequency (RF) transponder, configured to receive signals from the other sensors or the central controller 110. The RF transponder is a short-range transponder, adapted to transmit information between or among the sensors 102 or other points within the tires. Such short-range transmissions generally require less power than transmissions sent to a central receiver or other points in the vehicle. The controller 206 is configured to process signals from other sensors 102 or the central controller 110 via the antenna 202.

Each of the plurality of sensors 102 is adapted to send data transmissions. More specifically, the sensor 102a can be an acceleration sensor adapted to measure acceleration at a bearing surface or tread of the tire or wheel rim. The sensor 102b can be a temperature sensor for measuring a temperature of the bearing surface of the tire. Such temperature sensors include a thermo-couple probed that extends to an inner of the tire, which allows for measurement of the tire surface that opposes the road bearing surface. The sensor 102c can be a stress sensor adapted to detect stress in the sidewall of the tire. The sensor 102d can be light sensor that senses the surrounding light condition. As previously mentioned, other sensor types and configurations can be implemented in other embodiments of the invention, the particular sensor arrangement described herein being exemplary of only one embodiment.

Figure 3:
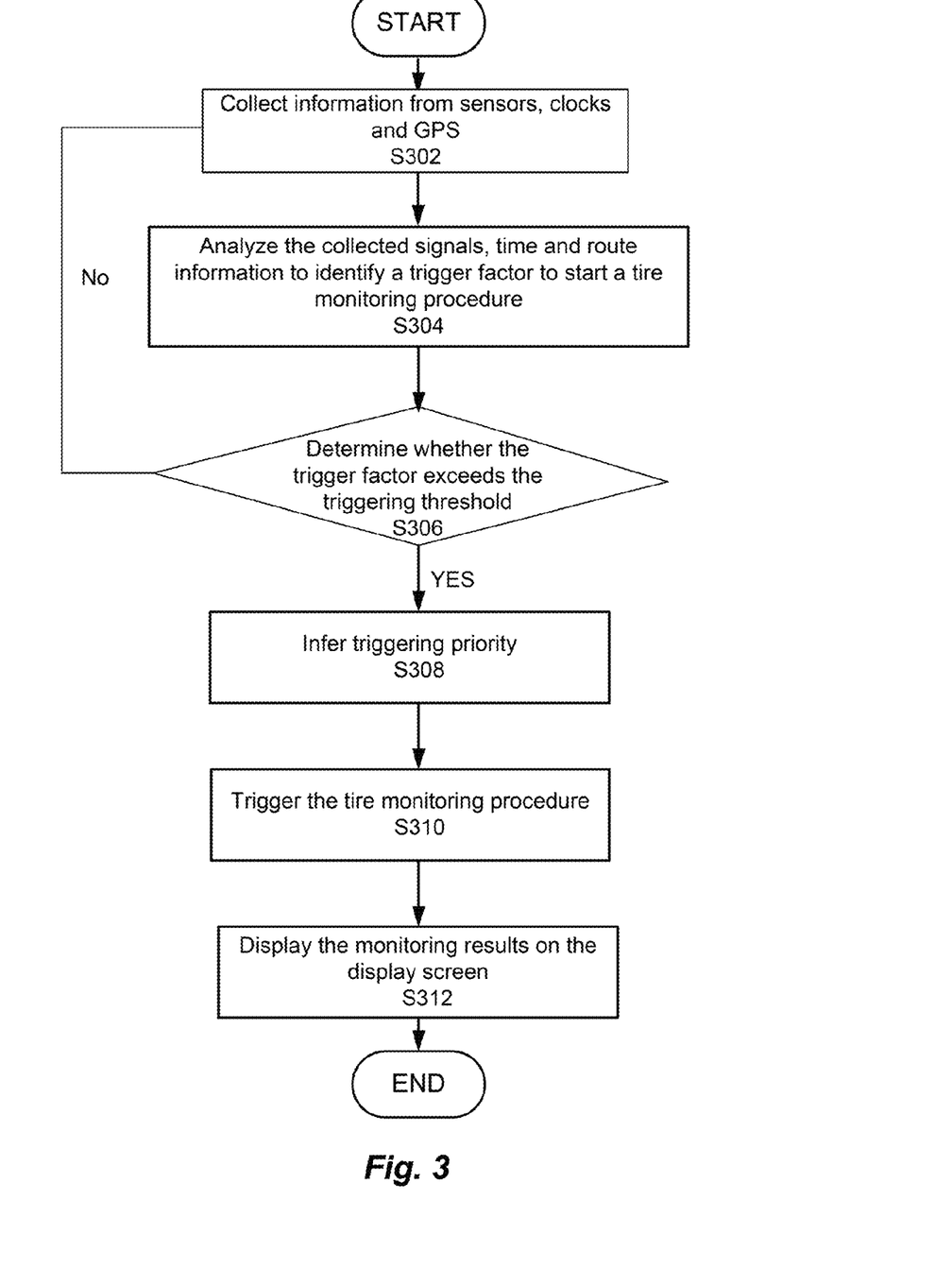
FIG. 3 is a flowchart diagram of the operation for automatically triggering a tire monitoring procedure according to one example.

Referring to FIG. 3, a flowchart describing a method for automatically monitoring the tire according to one example is shown.

In step 302, processing circuitry of the central controller 110 collects information from the sensors 102, time information from on and/or steepness of the route from the GPS 108.

In step 304, the processing circuitry analyzes the collected signals and the route information from the GPS 108 to identify a trigger factor to start a tire monitoring procedure. For example, in select embodiments, the central controller 110 can utilize the temperature, light, tire pressure information received from the sensors 102 via the transmission interface 200, the time information received from the clock 114 as well as the steepness of the route from the GPS 108 over time to determine the surrounding environment conditions of the tires in a particular time as well as in a particular route. Further, the central controller 110 in select embodiments can filter the surrounding environment information to only process surrounding environment information in a certain time or within a certain travel route.

In step 306, the processing circuitry of the central controller 110 determinates whether the collected information exceeds a triggering threshold indicating the number of temperature, light, time, and road conditions within a particular time and route. The triggering threshold is set in advance and can be predetermined for various occasions based on the user preference, expert opinion, and/or based on historical tire maintenance information. Accordingly, for relatively old tires, such as the tires with more than 30,000 miles, the triggering threshold is set higher than tires that are less used such as the tires with less than 10,000 miles. Further, the route may relate to an area which only has dangerous road condition at certain times of the year and therefore registration data of vehicles and seasonal information can be utilized to determine the trigger threshold. For example, if the area is located next to a lake that has harsh winters, the triggering threshold may be high for the winter timeframe but be lower in the summer when there will be less dangerous in the summer. Accordingly, the update threshold can be temporally set based on the time of day of time of year. If the detected number of surrounding environment changes exceeds the trigger threshold, the processing circuitry derives the updating priority in step 308.

Further examples of the triggering threshold, in addition to or alternatively from the described above are as follows. The triggering threshold for temperature can be the number of temperature that reflects a normal tire temperature below which experts would consider it is safe to operate without the need to monitoring the tire pressure. The triggering threshold of light can be the intensity of the sun-light that reflects a visibility of the road condition. The triggering threshold of time can be a period of time that the driver has the visibility of the road condition. The triggering threshold of road condition can be a hilliness and steepness condition of the route, such as a hill index. The hill index is a numerical indication of the overall "average" degree of hilliness and steepness of each route. It takes into account both total vertical climb and very steep climbs. For a 10-mile route has a "hill index" of 3.0, and a second 10-mile route has a hill index of 6.0, then the second route would take roughly twice as much "hill climbing effort" as the first. The processing circuitry may not trigger the monitoring process when the certain temperature, or the intensity of the sun-light, and the steepness of the route are below the triggering threshold in a particular area. The processing circuitry selectively triggers the tire monitoring process when the surrounding environmental parameters exceed the triggering threshold.

For example only the triggering threshold of temperature may be set equal to approximately 30-40 F to eliminate surrounding environment temperature. Additional higher thresholds such as 60-80 F or higher threshold can be used instead of or in addition to the lower threshold. If multiple thresholds are employed, the threshold may be assigned a measure of certainty. In other words, at the winter, a lower updating threshold value can be used, such as below freezing. However, at the summer, a higher threshold such as 80 F may be used to reflect average temperature at this season. The triggering threshold of time may be set equal to approximately 1-2 hours to eliminate unnecessary monitoring. Additional higher thresholds such as 4-5 hours or higher threshold can be used instead of or in addition to the lower threshold. If multiple thresholds are employed, the threshold may be assigned a measure of certainty. In other words, at the day time, a higher triggering threshold value can be used. However, at the night, a lower threshold such as 1 hour may be used because it is more dangerous to drive at night. The triggering threshold of time may be set equal to approximately 1-2 hours to eliminate unnecessary monitoring. Additional higher thresholds such as 4-5 hours or higher threshold can be used instead of or in addition to the lower threshold. If multiple thresholds are employed, the threshold may be assigned a measure of certainty. In other words, at the day time, a higher triggering threshold value can be used. However, at the night, a lower threshold such as 1 hour may be used because it is more dangerous to drive at night. The triggering threshold of light may be set equal to approximately 500-800 lux to eliminate typical overcast day. Additional higher thresholds such as 80,000-100,000 lux or higher threshold can be used instead of or in addition to the lower threshold. If multiple thresholds are employed, the threshold may be assigned a measure of certainty. In other words, at a sunny day, a higher triggering threshold value can be used. However, at a dark storm, a lower threshold such as 500 lux may be used because it is more dangerous to drive with low visibility. The triggering threshold of hill index in a route may be set equal to approximately 2.5-5 to eliminate general steepness of the route. Additional higher thresholds such as 8-10 or higher threshold can be used instead of or in addition to the lower threshold. If multiple thresholds are employed, the threshold may be assigned a measure of certainty. In other words, at a very steep route, a higher triggering threshold value can be used. However, at a relatively flat route, a lower threshold such as 2 may be used.

Other thresholds may be used based on the event itself or a particular location itself. For example, on a particular day for a particular event the triggering threshold may be increased as increased amounts of dangerous in the travel are expected. The backend sever 102 may also obtain the temperature, light and time information based on the accuracy of the temperature sensor, light sensor and the clock. Furthermore, the central controller 102 may be differentiates between the flat route as compared to the hill based on the information provided by the GPS.

In step 308, the processing circuitry derives the triggering priority of the tire monitoring procedure based on the surrounding environmental condition obtained from the temperature sensor, the light sensor, the clock and the GPS as described previously herein. For example, certain route may have priority for being monitored over other routes based on various factors such as preference, weather and/or safety considerations.

In step 310, the processing circuitry triggers the tire monitoring procedure based on the identified temperature, light, time and route condition. The processing circuitry may selectively trigger the tire monitoring procedure for locations with a higher trigger priority at an earlier time than for locations with a lower triggering priority.

The pressure sensors and accelerators physically measure the tire pressure and vibration in each tire. The accelerometer sensors are used to measure non-gravitational acceleration. When the tires that the accelerometer sensor attached to go from a standstill to any velocity, the accelerometers respond to the vibrations associated with such movement. When the vibration occurs, the microscopic crystals inside the accelerometers go under stress and generate a voltage to create a reading on any acceleration.

Figure 4:
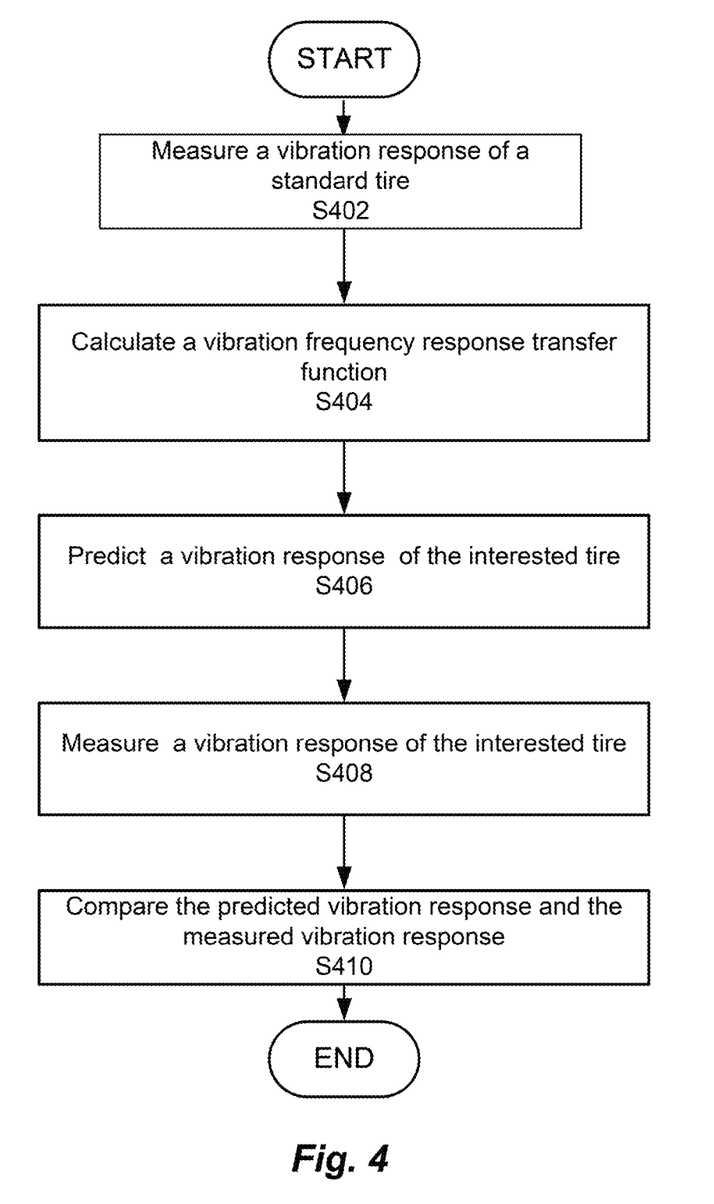
FIG. 4 is a flowchart diagram of the operation for measuring a vibration of the tire according to one example.

FIG. 4 is a flowchart of a method of monitoring the vibration of the tires. In step 402, a standard vibration response of a fully-functioned tire is measured by the accelerometer sensors on a test lab. In step 404, a vibration frequency response transfer function for the user's tire is calculated by a processing circuitry based on the user's tire's year and performance record. In step 406, a vibration response of the user's tire is predicted by the combination of the measured standard vibration response and the calculated vibration frequency response transfer function. In step 408, a vibration response of the user's tire is measured. In step 410, the measured vibration response of the user's tire is compared to predicted vibration response. If the measured vibration response is not consisted with the predicted vibration response, the results are displayed on the display screen and a maintenance alert can be also triggered.

Figure 5A:
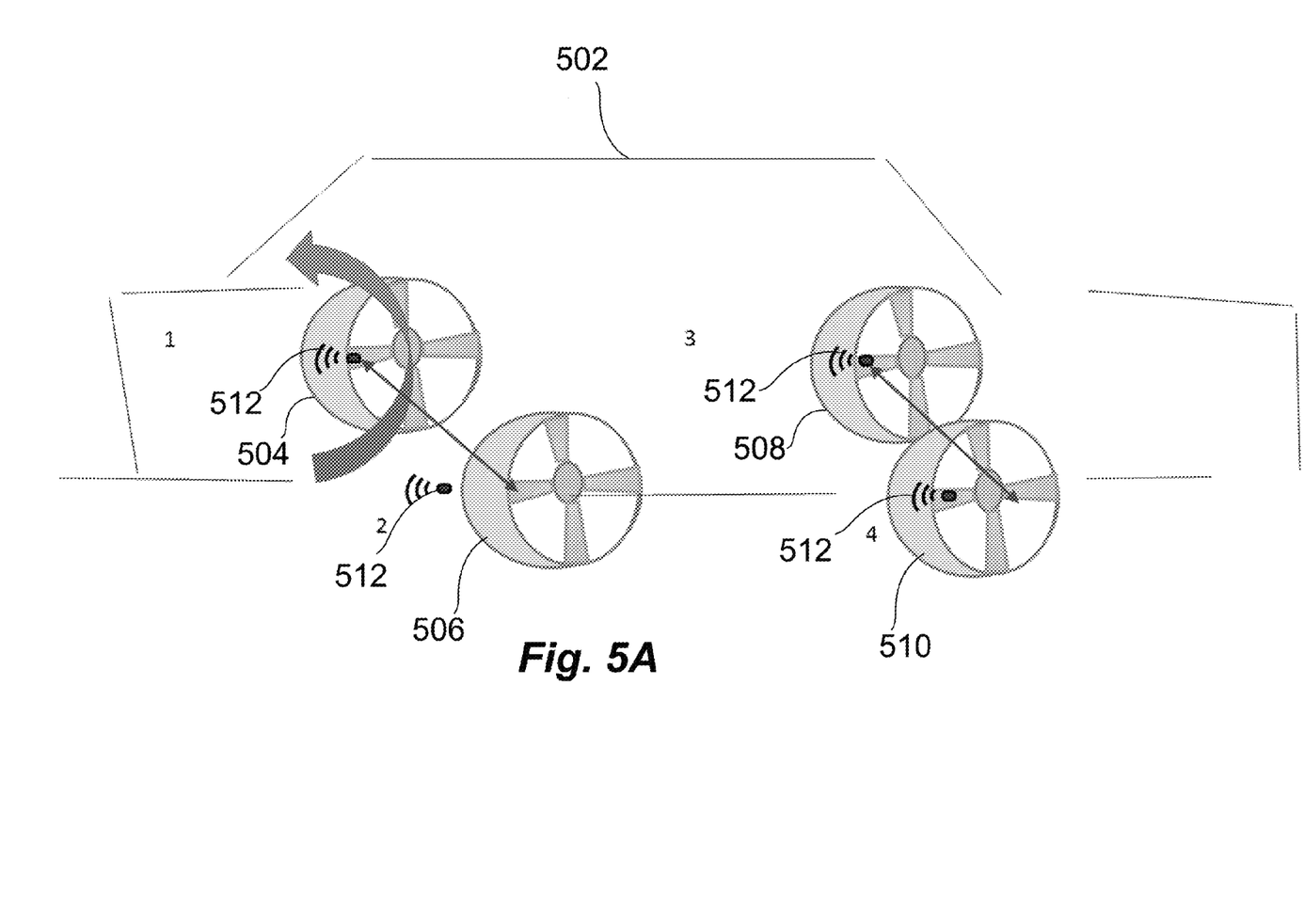
FIG. 5A is a schematic diagram of one embodiment for detecting alignments of the tires according to one example.

FIG. 5A is a schematic that shows the wireless sensors attached to the wheels of the car to detect the alignment of the wheels by measuring the distance between them during driving using wireless sensor. In FIG. 5A, a vehicle 502 is represented by a schematic illustration of a chassis of the vehicle and includes two front wheels 504 and 506 and two rear wheels 508 and 510. The wireless sensors 512 are mounted on each wheel.

Figure 5B:
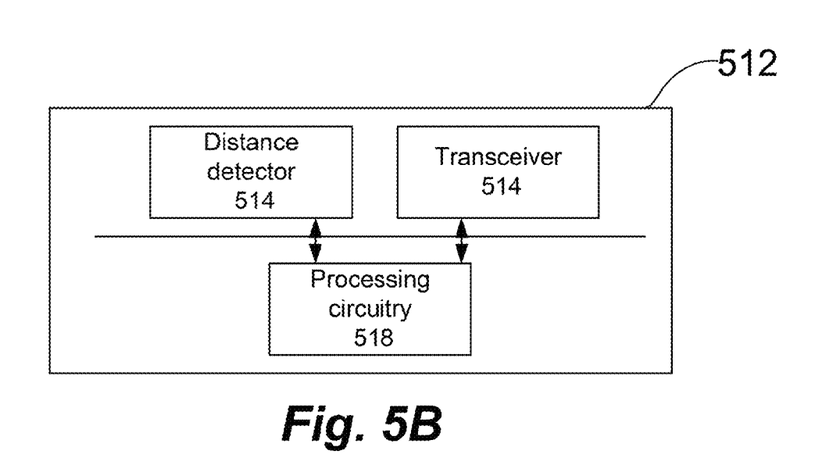
FIG. 5B is a schematic diagram of one embodiment of a wireless sensor according to one example.

As shown in FIG. 5B, each wireless sensor 512 includes a distance detector 514, a transceiver 516 and a processing circuitry 518. The distance detector 514 is connected to the processing circuitry that can be programmed to process information. The processing circuitry 518 can send the alignment information through the transceiver to the central controller 110, and the central controller 110 displays the results on the display screen 114. A three-dimensional (3D) representation of the wheels being aligned can be shown on display screen 114 along with indication of the detected alignment. In addition, the display screen 114 can also show maintenance guidance of the alignment to the drivers of the vehicle. Other variations of the hardware that may be used in this and other embodiments are discussed below.

The distance detector 514 uses triangulation measuring method to measure the distance between the wheels. The distance detector 514 emits narrow light beam from an infrared (IR) radiations source. After reflecting from the object, the beam went back to the original detector and landed on a position-sensible photo detector (PSD). The conductivity of this PSD depends on the position where the beam falls. The conductivity is converted to voltage and the voltage is digitalized by using analogue-digital converter, the distance can be calculated.

The wireless sensor includes a transceiver 514 for establishing a short-range, low power wireless network compliant with the IEEE 802.15.4 standard physical (PHY) layer for establishing a wireless communication link or network based on the 802.15.4 packet structure and modulation format, and an associated processing circuitry.

The transceiver 514 conforms to the IEEE 802.15.4 standard physical layer and medium access control (MAC) to establish full IEEE 802.15.4 compliant communication links or networks, or to the IEEE 820.15.4 PHY, MAC, and Zigbee Protocol Stacks to establish wireless communication links and networks utilizing the ZigBee communications protocol with similarly configured peripheral components and external devices.

When coupled to the associated processing circuitry, the transceivers 514 are capable of interconnecting into multiple topologies of wireless networks, such as those consistent with devices employing the current IEEE 802.15.4 standard and ZigBee communications protocols. Such low power transceivers 514 can reduce the power consumption of the battery.

The measurement of the distance can be taken at a fixed speed of the car, for example, 20 km/h, to get an accurate result.

Figure 6A:
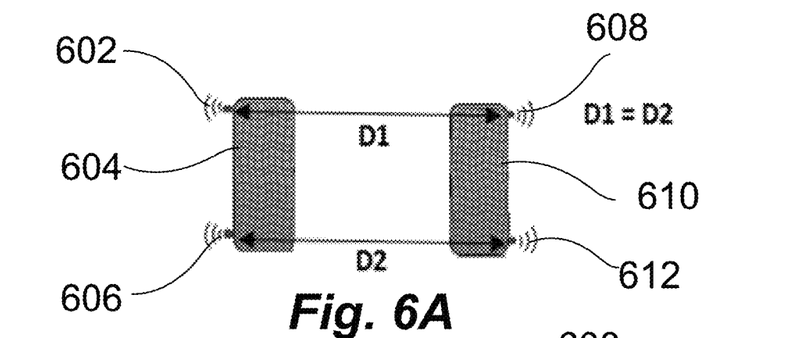
FIG. 6A, FIG. 6B and FIG. 6C illustrate methods of detecting tire alignment according to one example.
Figure 6B:
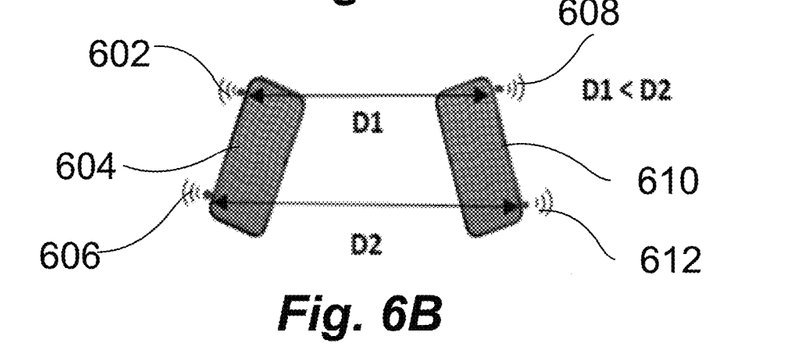
Figure 6C:
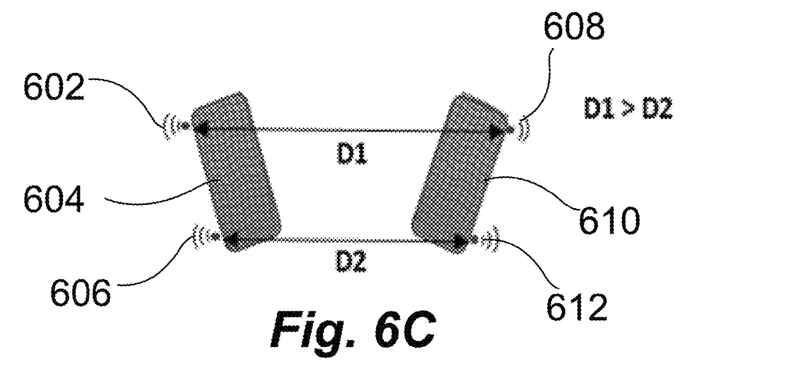

FIGS. 6A-C are exemplary measurement results of the proposed method. FIG. 6A shows that two parallel front or rear tires. Two wireless sensors are installed on each tire. A first wireless sensor 602 is at the front of the wheel of a left tire 604, a second wireless sensor 606 is at the rear of the wheel of the left tire 604, a third wireless sensor 608 is at the front of the wheel of a right tire 610, and a fourth wireless sensor 612 is at the rear of the wheel of the right tire 610. A distance $D_1$ is the distance between the first wireless sensor 602 and the third wireless sensor 608, and a distance $D_2$ is the distance between the second wireless sensor 606 and the fourth wireless sensor 612. In FIG. 6A, $D_1=D_2$, the tires 604 and 610 do not need the alignment. In FIG. 6B, $D_1<D_2$, the tires 604 and 610 need the alignment. Furthermore, In FIG. 6C, $D_1>D_2$, the tires 604 and 610 also need the alignment.

Figure 7:
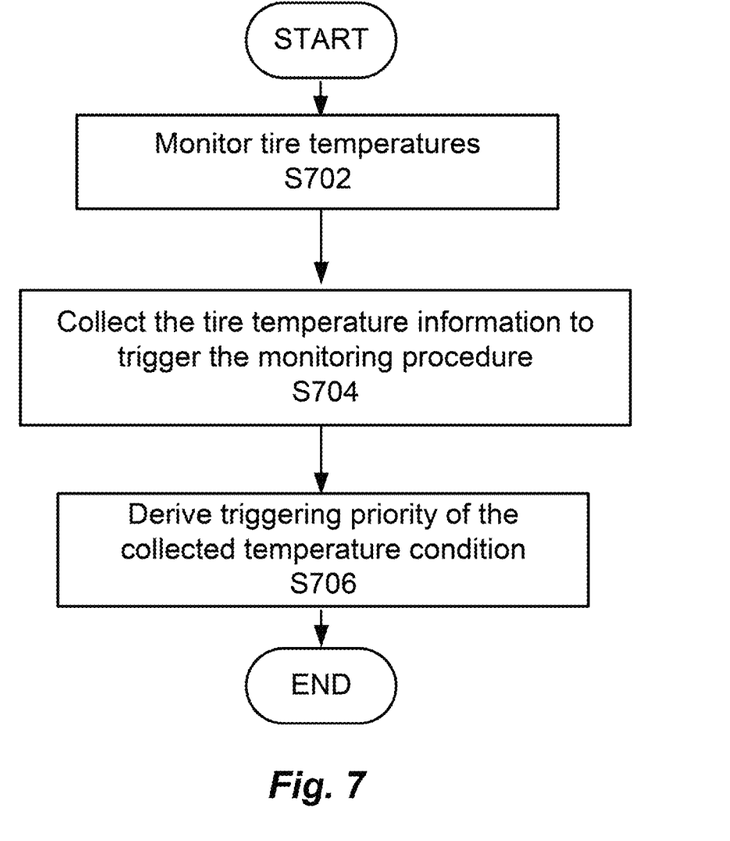
FIG. 7, FIG. 8 and FIG. 9 are flow charts illustrating methods of deriving triggering priority processes according to one example.

FIG. 7 shows a flowchart describing a method of collecting the temperature information according to one example.

In step 702, the processing circuitry of the central controller 110 regularly monitors the tire temperature. For example, the central controller 110 may monitor all the tires of the vehicles at a pre-determined time period or may monitor the tire temperature based on the driver's preference. Moreover, the controller may monitor the tire temperature based on information from the sensors 102. The processing circuitry can increase the monitoring frequencies sites at the late nights or early mornings based on the clock 114 of the automobile, or at times when the light conditions is below the visibility threshold based on the light information measured by the light sensor, or at the locations where the road conditions are dangerous based on location information provided by the GPS 108.

In step 704, the processing circuitry compares the measured tire temperature with a temperature threshold that stored in the central controller. In other words, a minimal threshold may be established in which the tire temperature at a particular time must be higher than a regular tire temperature in order to trigger an additional tire monitoring activity, to save the power consumption and extend the usage of the battery inside the sensor. If the minimum threshold is met, the central controller 102 determines that the temperature is high enough to trigger additional tire monitoring activity.

In step 706, the processing circuitry derives the triggering priority for the central controller 110 based on temperature information collected from the sensors 102 and/or from other information as described previously herein.

The processing circuitry of the central controller 110 selectively triggers the traffic map based on the triggering priority. The processing circuitry may selectively trigger the monitoring procedure for locations with a higher triggering priority at an earlier time than for locations with a lower triggering priority. The updating priority may be set equal to two levels, such as a high level, and a low level as described previously herein.

For example only, the high level triggering priority may be set when the obtained temperature information indicates that the tire temperature is very high. The high level of the triggering priority may be changed or reduced to a lower setting when the central controller 110 determines that the temperature of the tire drops. The low level may be set when the obtained traffic information indicates that the tire temperature is low. Other thresholds may be used.

Figure 8:
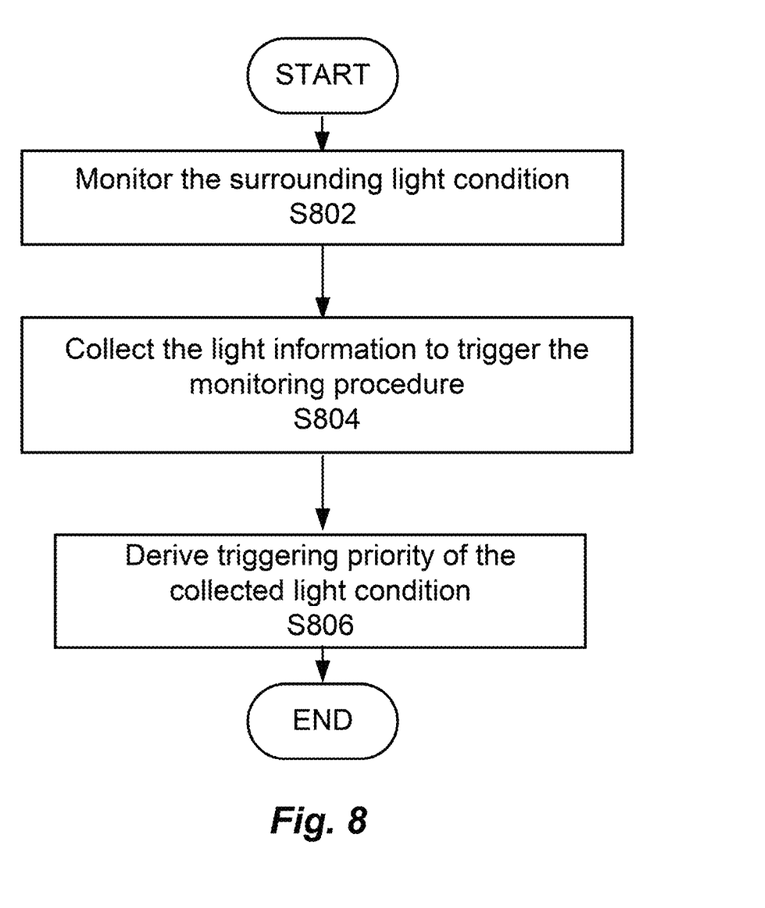

FIG. 8 shows a flowchart describing a method of collecting the light information according to one example.

In step 802, the processing circuitry of the central controller 110 regularly monitors the light condition around the vehicle. For example, the central controller 110 may monitor all the tires of the vehicles at a pre-determined time period or may monitor the light conditions based on the driver's preference. Moreover, the controller may monitor the light temperature based on information from other sensors 102. The central controller 110 controller can increase the monitoring frequencies sites at the late nights or early mornings based on the clock of the automobile, or at times when the light conditions is below the visibility threshold based on the light information measured by the light sensor, or at the locations where the road conditions are dangerous based on location information provided by the GPS 108.

In step 804, the processing circuitry collects light related information from the light sensors. In other words, a minimal threshold may be established in which the light temperature at a particular time must be higher than a regular light requirement in order to trigger an additional tire monitoring activity, to save the power consumption and extend the usage of the battery inside the sensor. If the minimum threshold is met, the central controller 110 determines that the light is low enough to be used to trigger additional tire monitoring activity.

In step 806, the processing circuitry derives the triggering priority for the central controller 110 based on light information collected from the sensors 102 and/or from other information as described previously herein.

The processing circuitry of the central controller 110 selectively triggers the monitoring procedure based on the triggering priority. The processing circuitry may selectively trigger the monitoring procedure for locations with a higher triggering priority at an earlier time than for locations with a lower triggering priority. The updating priority may be set equal to two levels, such as a high level, and a low level as described previously herein.

For example only, the high level triggering priority may be set when the obtained light information indicates that there is a dark storm. The high level of the triggering priority may be changed or reduced to a lower setting when the central controller 110 determines that the light condition becomes better. The low level may be set when the obtained light information indicates that there is a sunny day. Other thresholds may be used.

Figure 9:
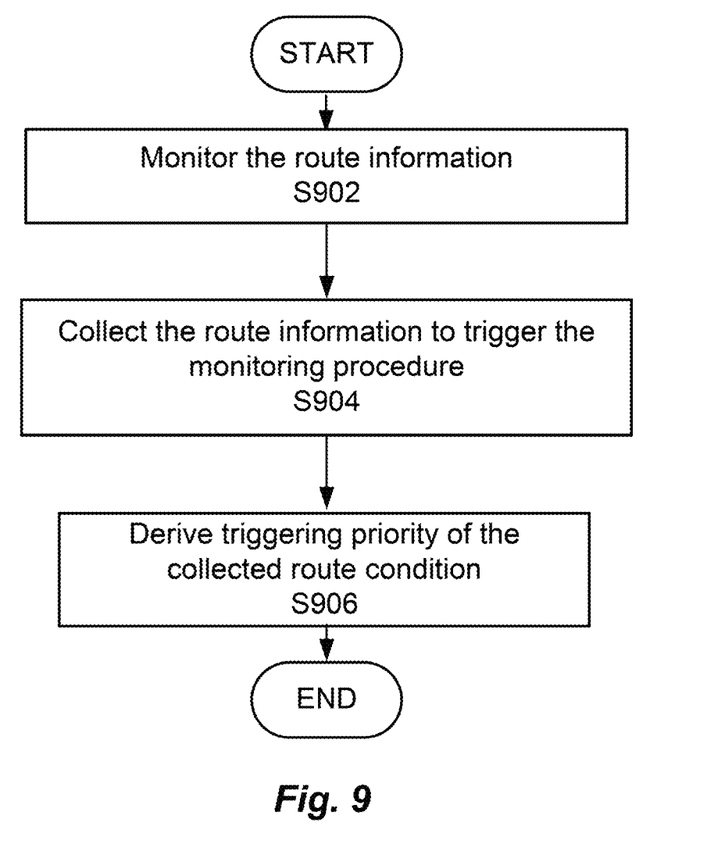

FIG. 9 shows a flowchart describing a method of collecting the route information according to one example.

In step 902, the processing circuitry of the central controller 110 regularly monitors the route information of the vehicle. For example, the central controller 110 may monitor the route in GPS at a pre-determined time period or may monitor the route conditions based on the driver's preference. Moreover, the central controller 110 may monitor the route condition based on information from other sensors 102 or GPS 108. The central controller 110 controller can increase the monitoring frequencies sites at the late nights or early mornings based on the clock of the automobile, or at times when the light conditions is below the visibility threshold based on the light information measured by the light sensor, or at the locations where the road conditions are dangerous based on location information provided by GPS.

In step 904, the processing circuitry collects route related information from the sensors, the clock and the GPS for the tire monitoring purpose. Thus, route information can be pulled from various sources and collated together to determine an accuracy level of the received information. In other words, a minimal threshold may be established in which the hill index at a particular time must be higher than a regular hill index requirement in order to trigger an additional tire monitoring activity, to save the power consumption and extend the usage of the battery inside the sensor. If the minimum threshold is met, the central controller 110 determines that the route is steep enough to trigger additional tire monitoring activity.

In step 906, the processing circuitry derives the triggering priority for the central controller 110 based on route conditions collected from the GPS 108 and/or from other information as described previously herein.

The processing circuitry of the central controller 110 selectively triggers the monitoring procedure based on the triggering priority. The processing circuitry may selectively trigger the monitoring procedure for locations with a higher triggering priority at an earlier time than for locations with a lower triggering priority. The updating priority may be set equal to two levels, such as a high level, and a low level as described previously herein.

For example only, the high level triggering priority may be set when the obtained route information indicates that a very steep hill on the route. The high level of the triggering priority may be changed or reduced to a lower setting when the central controller 110 determines that the route condition becomes flatter and safer. This can be determined by the central controller 110 for example based on route information provided by the GPS 108. The low level may be set when the obtained information indicates that there is a sunny day or the route condition is good. Other thresholds may be used. The triggering threshold of road condition can be a hilliness and steepness condition of the route, such as a hill index.

Figure 10:
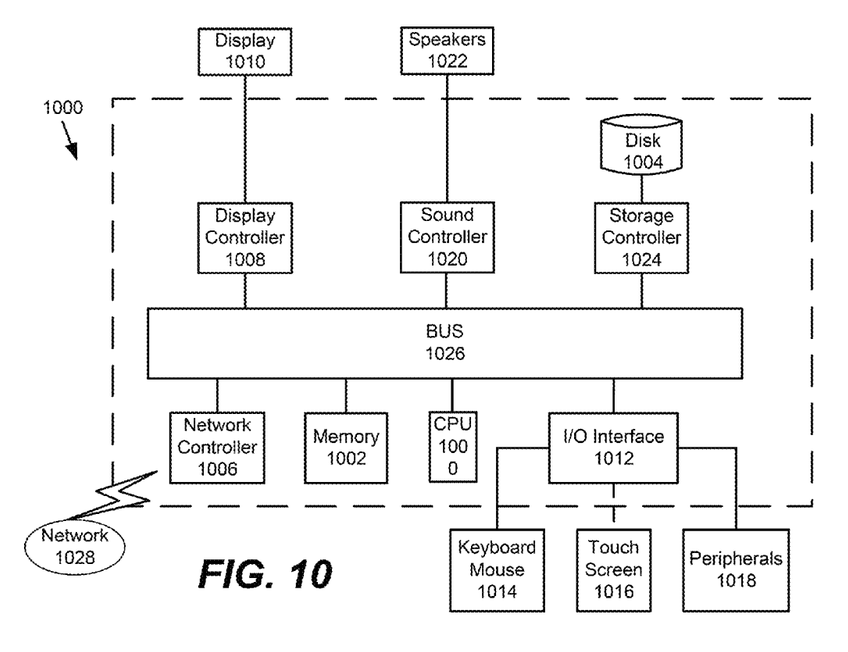
FIG. 10 is a schematic diagram of an exemplary processing system according to one example.

Next, a hardware description of the controller according to exemplary embodiments is described with reference to FIG. 10. In FIG. 10, the device includes the processing circuitry, or a CPU 1000, which performs the processes described above. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art.

CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The device in FIG. 10 also includes a network controller 1006, such as an Intel Ethernet PRO network interface card from Intel Corporation of America, for interfacing with network 1028. As can be appreciated, the network 1028 can be a public network, such as the Internet, or a private network such as an LAN or WAN network, or any combination thereof and can also include PSTN or ISDN sub-networks. The network 1028 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the device, such as Sound Blaster X-Fi Titanium from Creative, to interface with speakers/microphone 1022 hereby providing sounds and/or music. The general purpose storage controller 1024 connects the storage medium disk 1004 with communication bus 1026, which may be an ISA, EISA, VESA, PCI, or similar, for interconnecting all of the components of the device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A tire monitoring method implemented by a tire monitoring system, the method comprising:
    collecting, at a sensor mounted to a wheel or a wheel cover of an automobile, information from signals emitted from at least one sensor mounted to another wheel cover;
    collecting at a controller circuitry mounted to a wheel cover of the automobile wheel, route information from a global positioning system (GPS) receiver disposed on an automobile;
    collecting at the controller circuitry time information from a clock;
    analyzing at the controller circuitry collected signals, the time information, and the route information to identify at least one trigger factor based on tire characteristics;
    determining at the controller circuitry whether the at least one triggering factor exceeds a triggering threshold based on the collected signals the time information and the route information;
    deriving at the controller circuitry when the at least one triggering factor exceeds the triggering threshold, a triggering priority indicating an order in which the triggering factor and other triggering factors are processed based on the collected signals, time information and route information;
    triggering a tire monitoring procedure based on the collected information, the triggering threshold and the triggering priority; and
    displaying at a display screen results of the tire monitoring procedure and providing a visual indication of the tire characteristic that caused the triggers factor to exceed the triggering threshold.

2. The method of claim 1, wherein the tire monitoring procedure includes a tire pressure measurement, a tire vibration measurement and a tire alignment measurement.

3. The method of claim 2, further comprising setting with the controller circuitry the triggering threshold based on a function of temperature, time, sun-light condition, and route information.

4. The method of claim 1, wherein the controller sets the triggering priority as a function of the collected signals, the time information and the route information.

5. The method of claim 1, wherein the controller circuitry provides a warning when a projected GPS route indicates a terrain that is inappropriate for a present condition of the tire.

6. The method of claim 1, wherein the sensor includes at least one of a pressure sensor, a wireless sensor, a temperature sensor, and a light sensor.

7. The method of claim 1, wherein the wireless sensor is configured to determine a distance between two tires and includes a transceiver, and a distance sensor.

8. A monitoring system for automatically triggering a tire monitoring procedure, comprising:
    one or more sensors mounted to a wheel or wheel cover of an automobile configured to collect information from one or more tires or surrounding environment information;
    a clock configured to provide time information;
    a global positioning system (GPS) receiver disposed on the automobile, wherein the GPS receiver is configured to provide route information;
    a display screen configured to display tire monitoring information and
    controller circuitry configured to
        analyze the collected information from the one or more sensors, the time information, and the route information to identify at least one trigger factor based on a tire characteristic;
        determine whether the at least one triggering factor exceeds a triggering threshold based on the collected information, time information and route information;
        derive when the triggering factor exceeds the triggering threshold, a triggering priority indicating an order in which the triggering factor and other triggering factors are processed based on the collected signals and route information;
        trigger a tire monitoring procedure based on the collected information, the triggering threshold and the triggering priority; and
        display at the display screen, results of the tire monitoring procedure to provide a visual indication of the tire characteristic that caused the triggers factor to exceed the triggering threshold.

9. The system of claim 8, wherein the tire monitoring procedure includes tire pressure measurements, tire vibration measurements and tire alignment measurements.

10. The system of claim 8, wherein the one or more sensors include at least one of a pressure sensor, a wireless sensor, a temperature sensor, and a light sensor.

11. The system of claim 8, wherein the controller circuitry further derives the triggering priority through the temperature by:
    monitoring temperature information from at least one temperature sensor;
    collecting the temperature information to trigger the tire monitoring procedure; and
    inferring the triggering priority based on priority levels set by the controller circuitry.

12. The system of claim 8, wherein the controller circuitry further derives the triggering priority through a light condition by:
    monitoring sun-light information from at least one light sensor;
    obtaining light information to trigger the tire monitoring procedure; and
    inferring the triggering priority based on priority levels set by the controller circuitry.

13. The system of claim 8, wherein the controller circuitry further derives the triggering priority through route information by:
    monitoring the route information from at least one GPS;
    obtaining route information to trigger the tire monitoring procedure; and
    inferring the triggering priority based on priority levels set by the controller as a function of the comparing.

14. The system of claim 8, wherein the controller circuitry is further configured to determine an alignment of the tires by:
    collecting a first distance between two parallel tires at a first position of the tires measured by one or more wireless sensors, and a second distance between two parallel tires at a second position of the tires measured by the one or more wireless sensors,
    determining whether the first distance and the second distance match, and
    displaying an alignment maintenance alert on the display screen when the first distance is not equal to the second distance.

* * * * *